United States Patent [19]

Scholz

[11] Patent Number: 5,539,407
[45] Date of Patent: Jul. 23, 1996

[54] RADAR APPARATUS PROVIDED WITH ECCM FACILITIES

[75] Inventor: John A. Scholz, Hengelo, Netherlands

[73] Assignee: Hollandse Signaalapparaten B.V., Hengelo, Netherlands

[21] Appl. No.: 337,499

[22] Filed: Nov. 8, 1994

[30] Foreign Application Priority Data

Nov. 19, 1993 [NL] Netherlands ............................ 9302002

[51] Int. Cl.$^6$ .................................................... G01S 7/36
[52] U.S. Cl. ................. 342/17; 342/18; 342/39; 342/157; 342/379
[58] Field of Search ................. 342/16–18, 39, 342/154, 157, 159, 162, 371, 372, 379

[56] References Cited

U.S. PATENT DOCUMENTS

| | | | |
|---|---|---|---|
| 4,010,469 | 3/1977 | Marcum | 342/16 |
| 4,044,359 | 8/1977 | Applebaum et al. | 342/379 |
| 4,435,710 | 3/1984 | Powell. | |
| 4,935,743 | 6/1990 | Guilhem et al. | 342/17 |
| 5,162,805 | 11/1992 | Cantrell | 342/17 |

FOREIGN PATENT DOCUMENTS

| | | | |
|---|---|---|---|
| 0374987 | 6/1990 | European Pat. Off. . | |
| 2632419 | 12/1989 | France . | |
| 3028225C1 | 9/1992 | Germany . | |
| 2259209 | 3/1993 | United Kingdom | 342/17 |

*Primary Examiner*—Harold J. Tudor
*Attorney, Agent, or Firm*—Oblon, Spivak, McClelland, Maier & Neustadt

[57] ABSTRACT

A radar apparatus that is provided with auxiliary antennas (5, 10) of an omnidirectional nature. In addition to customary ECCM applications, such as side-lobe suppression and side-lobe blanking, the auxiliary antennas (5, 10) are also used for the emission of frequency-shifted pulses which are emitted simultaneously with radar transmitter pulses. To this effect, the radar apparatus is provided with auxiliary transmitters (8, 13). Furthermore, auxiliary receivers (6, 11) have been provided for analyzing the responses of jammers to the frequency-shifted pulses.

13 Claims, 3 Drawing Sheets

RADAR APPARATUS PROVIDED WITH ECCM FACILITIES

BACKGROUND OF THE INVENTION

The invention relates to a radar apparatus comprising at least one directional main antenna, transmitter means connected to the main antanna, steering means for generating radar transmitter steering pulses to be supplied to the transmitter means, receiver means connected to the main antenna, and at least one auxiliary antenna connected to an auxiliary receiver, to be connected to the receiver means for reducing the effect of jammers on said receiver means.

A radar apparatus of this kind is known from patent specification EP-B 0.076.536, which describes a radar apparatus provided with a side-lobe suppression unit. A side-lobe suppression unit as claimed in said patent specification is exceptionally suitable for the suppression of noise signals originating from active interference sources such as jammers, which signals are received via the main antenna side lobes. The side-lobe suppression unit as claimed in said patent specification comprises an omnidirectional auxiliary antenna added to the main antenna. By subtracting the signals received via this auxiliary array in a control loop from the signals received by a directional main antenna, the jamming signals received via the side lobes of this main antenna are suppressed. In view of the run-in time required for the control loop, this well-known ECCM (Electronic Counter Counter Measure) measure is less suitable for pulsed jammers and is actually only effective against jammers of the CW or pseudo-CW type.

In addition to the above-described side-lobe suppression, it is also possible to apply side-lobe blanking, as is for instance known from EP-B 0.173.360. In this patent specification, the signals received via the main antenna are continuously compared with the signals received via the auxiliary antenna, the receiver being interrupted if signals received via the auxiliary antenna are stronger than the signals received via the main antenna. This ECCM measure is effective against pulsed jammers.

A drawback attached to said ECCM measures is that they are merely passive and that the auxiliary antenna is used for reception only.

SUMMARY OF THE INVENTION

The ECCM facilities according to the invention obviate this drawback and are characterised in that the steering means are designed for generating transmitter steering pulses which deviate from radar transmitter steering pulses, the former pulses being supplied to at least one auxiliary antenna via at least one auxiliary transmitter. This measure proves to be most effective against the more intelligent repeater jammers, particularly if these repeater jammers receive the transmitter pulses emitted via the auxiliary antenna more strongly than the radar transmitter pulses emitted by the main antenna.

In a first favourable embodiment, the radar apparatus is characterised in that the steering means are designed for at least substantially simultaneous generation of the radar transmitter steering pulses and the transmitter steering pulses. This means that, during the reception of radar echoes, the auxiliary antenna remains available for the implementation of passive ECCM measures, such as for instance said side-lobe suppression and side-lobe blanking. Moreover, the jammer may be adversely affected by the simultaneous reception of the radar transmitter pulse and the divergent transmitter pulse.

A favourable version of the first embodiment is obtained if the steering means are designed for the generation of transmitter steering pulses whose frequency deviate from the radar transmitter steering pulse frequency. This implies that the jammer is required to spread the available transmitting power over a larger frequency range. The steering means can then be designed such that transmitter steering pulses are generated whose type of modulation at least substantially corresponds to the type of modulation of the radar transmitter pulses, which has a cost-reducing effect. To this end, the steering means can comprise at least one auxiliary oscillator and at least one mixer for generating frequency-shifted radar transmitter steering pulses for at least one auxiliary antenna. It may then be relevant to select a mixer type that suppresses the original radar transmitter pulses at its output and only passes the frequency-shifted pulses, or in case of an image rejection mixer well-known in the art being used, passes the pulse.

Another possibility is to use a plurality of auxiliary oscillators, having different frequencies in a range of for instance 20–200 MHz, each oscillator being provided with a mixer that generates transmitter steering pulses at a corresponding frequency shift. These transmitter steering pulses may then, via one or more auxiliary transmitters, be applied to one or more auxiliary antennas. This will cause more confusion to the jammer and will reduce the probability of effectively jamming the radar apparatus, since the transmission power available for jamming will have to be spread over a yet larger frequency range.

An advanced repeater jammer is generally capable of receiving, amplifying and retransmitting simultaneously a signal received via a side lobe of the main antenna and via a main lobe of the auxiliary antenna. Retransmission is usually effected at a strength that is proportional to the strength of the signal received. A further favourable embodiment of the invention is therefore characterised in that the at least one auxiliary antenna is designed for generating, during emission of the transmitter pulses, an auxiliary antenna main lobe which is at least substantially stronger than the main antenna sidelobes. In general, an auxiliary antenna can be dimensioned such that at the horizon, where the jammers are mostly situated, the transmitter pulses received are stronger by 10–20 dB than the radar transmitter pulses received via the main antenna sidelobes. A further improvement can be obtained by using for instance four auxiliary antennas, each of which covers at least a partially different space angle. Thus, by accepting a certain measure of directivity, a 6 dB improvement can be obtained in the ratio between said received signal strengths.

The radar apparatus thus obtained is exceptionally suitable for examining jamming pulses generated by repeater jammers. A jamming pulse is usually a replica of a transmitter pulse and the accuracy of the replica may provide useful information about the jammer's identity. The radar apparatus is then characterised in that identification means have been provided, connected to at least one auxiliary receiver, for analyzing jammer-generated responses to transmitted radar pulses. By tuning an available auxiliary receiver to the transmitter pulse that has been shifted in frequency as compared with the radar transmitter pulse, interference with echoes produced by the radar transmitter pulse is avoided. To this end, a local oscillator signal, shifted by an auxiliary oscillator may advantageously be used for the auxiliary receiver.

A further, exceptionally favourable embodiment of the radar apparatus according to the invention is characterised in that the identification means are designed for controlling the steering means. In its simplest form, this controlling entails a command for modification of at least one transmitter pulse. This way, it is possible to test the jammer's intelligence and to verify whether the repeater jammer repeats per pulse or uses the same replica. If the steering means are for instance designed for the burst-wise generation of identical radar transmitter pulses, the command may entail the modification of a transmitter steering pulse within a burst. This may be useful against certain types of jammers whose design is based on the principle that the radar apparatus to be jammed transmits bursts of for instance 16 pulses. The operating method of this type of jammer will then be such that upon reception of the first out of a burst of 16 pulses, this first received pulse serves as the replica. Upon the next received pulse, the PRF (Pulse Repetition Frequency) is calculated on the basis of the time difference. On the basis of this calculated PRF and the available replica, the jammer will then retransmit a burst of 16 replica pulses, if required after a certain phase shift or time delay, for instance for applying range gate stealing. The radar apparatus can now be arranged such that at random moments a modification of one or several transmitter pulses in the series of 16 pulses occurs. If the auxiliary antenna nevertheless receives a burst of 16 pulses, this yields more information on the type of jammer.

An advantageous embodiment of the invention is characterised in that the modification of a transmitter pulse comprises the omission of the transmitter pulse. A further favourable embodiment is characterised in that the modification of a transmitter pulse comprises a frequency shift of the transmitter pulse.

A further favourable embodiment of the radar apparatus is characterised in that the identification means comprise a database of known jammers, comparison means for comparing the received jammer signal with the jammer signals contained in the database and selection means for selecting commands for the steering signals. This way, the identity of a jammer can be passively ascertained, after which any further information on the jammer can be obtained in an interactive phase.

BRIEF DESCRIPTION OF THE DRAWINGS

The radar apparatus according to the invention will now be described with reference to the following figures, of which.

DETAILED DESCRIPTION OF THE DRAWINGS

Figure 1:
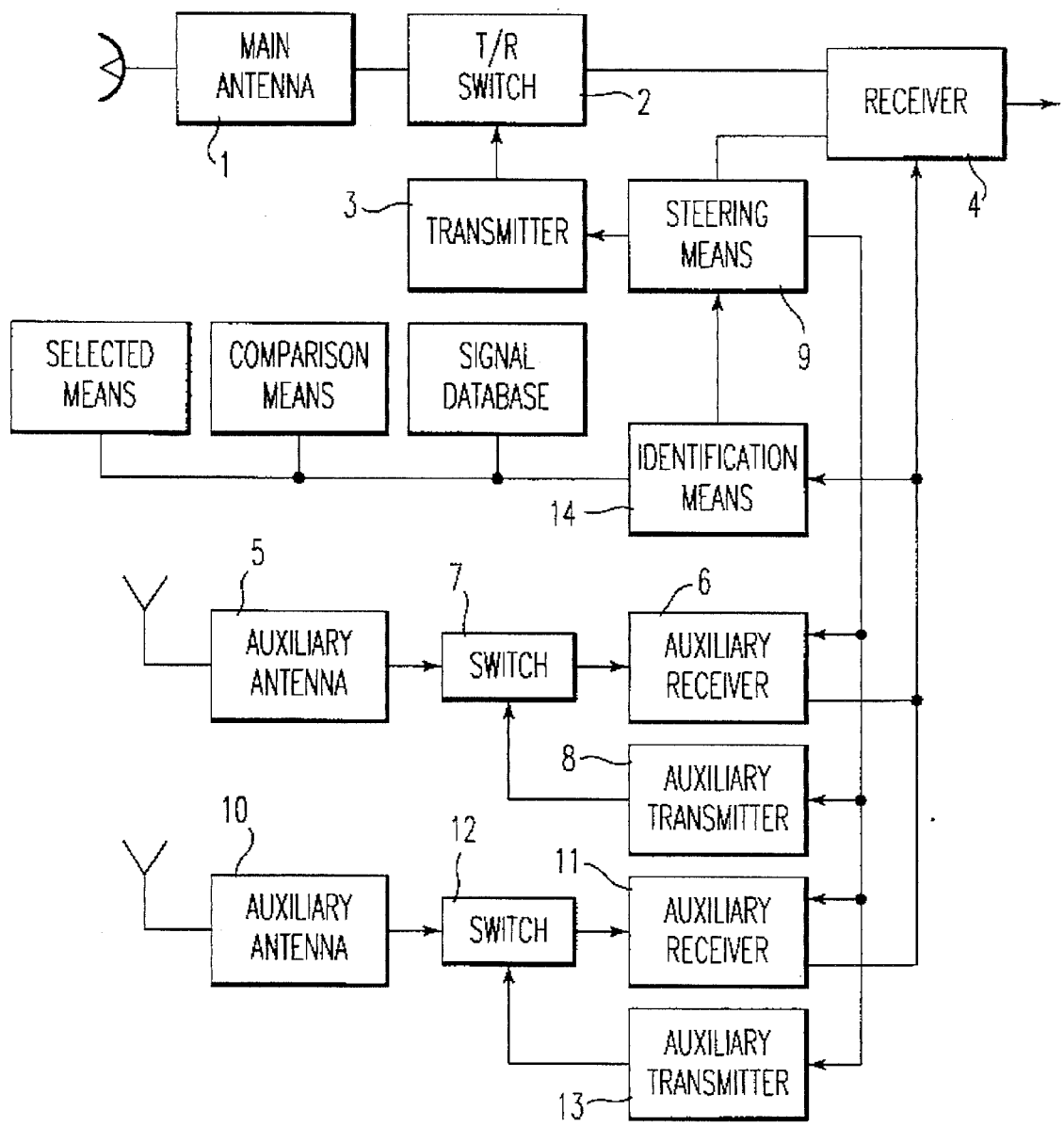
FIG. 1 represents a radar apparatus with ECCM facilities according to the invention.

FIG. 1 shows a block diagram of a possible embodiment of a radar apparatus according to the invention. As usual in the art, main antenna 1 is connected to transmitter means 3 and receiver means 4 via T/R device 2, for instance a circulator. Main antenna 1 can for instance be a rotary search antenna, or an active phased array antenna, in which case the T/R device 2, transmitter means 3 and receiver means 4 are an integral part of the array of modules constituting the actual main antenna 1. FIG. 1 additionally shows auxiliary antenna 5 which is connected to an auxiliary receiver 6 for applying signals received via auxiliary antenna 5 to receiver means 4. Auxiliary antenna 5 is usually of the omnidirectional or semi-omnidirectional type, although it may also show a certain measure of directivity. It is important for auxiliary antenna 5, at least in the space angle in which it will be effective, to have an antenna gain exceeding that of the side lobes of main antenna 1. Only then will it be possible to realize ECCM measures well-known in the art such as side-lobe suppression or side-lobe blanking. Novel is T/R device 7 to which is connected auxiliary transmitter 8. According to the inventive thought underlying the invention, auxiliary antenna 5 is used for the emission of pulses which, although resembling radar transmitter pulses emitted by main antenna 1, are divergent in one way or another. A jammer, for instance a repeater jammer, will use this divergent transmitter pulse, which is nearly always received stronger than the actual radar transmitter pulse used to generate a pulse which is aimed at jamming the radar apparatus. By designing receiver means 4 such that the divergent pulses are blocked, the effect of the jammer may be reduced.

Transmitter pulses emitted by auxiliary antenna 5 may differ from radar transmitter pulses by a divergent modulation, for instance by applying an upchirp in case of radar transmitter pulses provided with a downchirp, or by a different timing or frequency. The last mentioned solution requires the least hardware and has the added advantage that the simultaneous emission of the transmitter pulse and the radar transmitter pulse increase the jammer's confusion. Such a steering pulse for auxiliary transmitter 8 can simply be derived from a radar transmitter steering pulse for transmitter means 3, as generated by steering means 9.

FIG. 1 additionally represents auxiliary antenna 10, auxiliary receiver 11, T/R device 12 and auxiliary transmitter 13, which are also capable of generating divergent transmitter pulses, whereby the frequency of these transmitter pulses mostly will deviate from the transmitter pulses emitted by auxiliary antenna 5. This will add to the jammer's confusion. Auxiliary antenna 5 and auxiliary antenna 10 may cover the same space angle, as a result of which the jammer does receive two divergent pulses per radar transmitter pulse, but they may also comprise different space angles. In the latter case, the overall space angle to be covered can be divided into for instance N partially overlapping space subangles, each of which is covered by an auxiliary antenna. This then requires N auxiliary antennas and N auxiliary transmitters, but the gain of these auxiliary antennas may be considerably higher than the gain of an omnidirectional antenna, thus causing an increase of the effective radiated power of the divergent pulses. This will make it more difficult for the jammer to adversely affect radar operation.

In FIG. 1 the receiver means 4 obtain, as usual, a local oscillator signal from steering means 9. Auxiliary receiver 6 receives a divergent local oscillator signal that has been selected such that auxiliary receiver 6 is tuned to the frequency of the transmitter pulses emitted by auxiliary antenna 5. The output signal of auxiliary receiver 6 can subsequently be applied to identification means 14, by means of which the reaction of a jammer on transmitter pulses emitted by auxiliary antenna 5 can be analysed. It may be checked for instance how a certain modulation from such as a frequency chirp is imitated and how a burst of for instance 16 pulses is repeated. An analysis thus effected mostly enables the jammer's identity to be established. This analysis often requires the use of a database in which the distinctive characteristics of well-known jammers are stored. Similarly, auxiliary antenna 10 and auxiliary receiver 11 can also be used to obtain information concerning the jammer's identity.

When the radar apparatus, as is customary with state-of-the-art doppler radar apparatuses, emits radar transmitter pulses per burst of for instance 16 identical pulses, it is according to the invention possible to extract more information from the jammer. To this end it is possible to use the identification means 14 to control the steering means 9 in such a way that one or several transmitter steering pulses are modified per burst without causing a modification of the radar transmitter steering pulses. An obvious modification entails the omission of a single transmitter steering pulse. The jammer thus illuminated via an auxiliary antenna may then fill in the missing pulse or not. An additional obvious modification relates to the frequency change of a single transmitter steering pulse, which also offers the possibility to check the jammer's reaction. The way in which the jammer reacts may further contribute to its identification.

Figure 2:
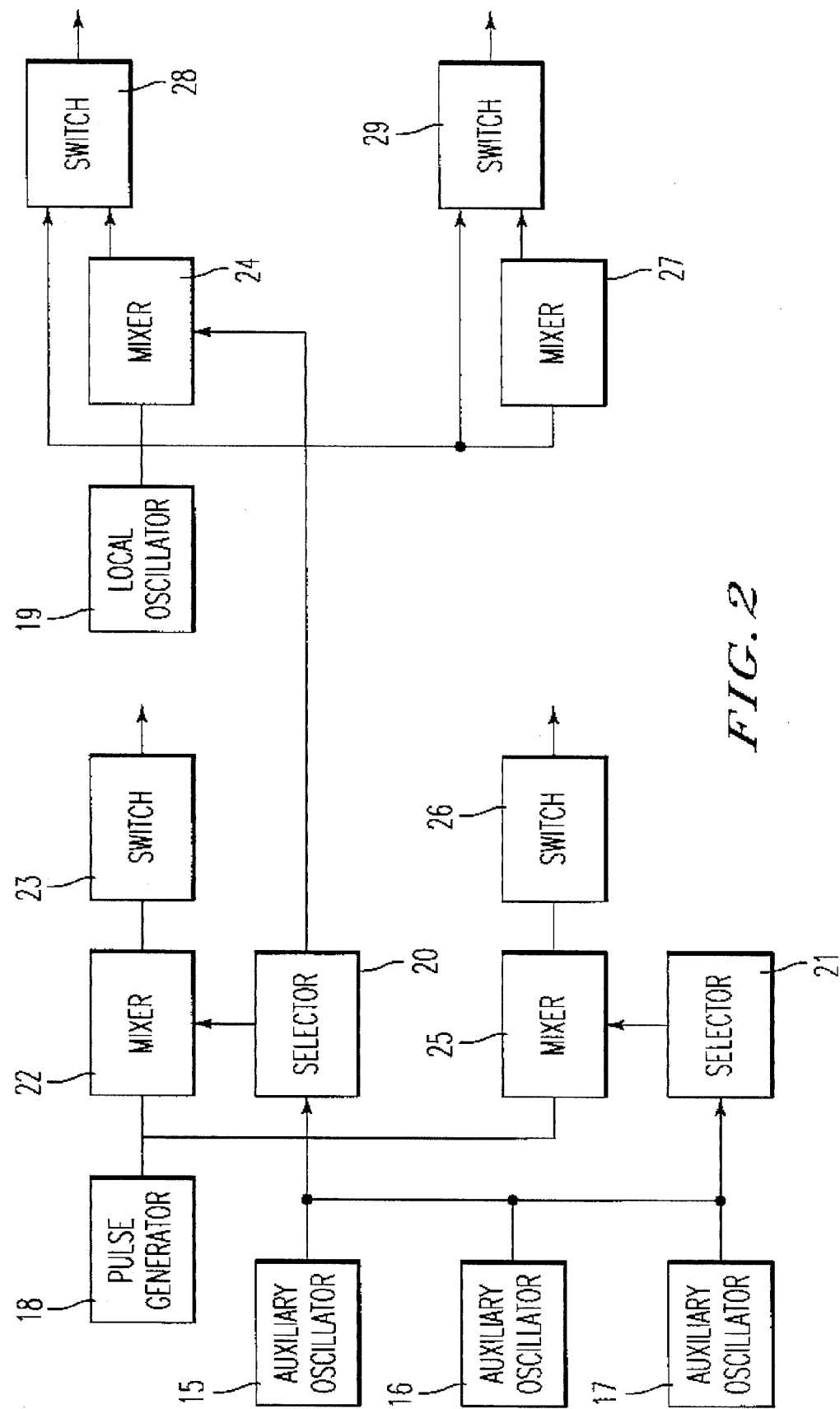
FIG. 2 represents a possible embodiment of the control means incorporated in the radar apparatus according to the invention.

FIG. 2 shows a possible embodiment of the steering means of the radar apparatus according to the invention, which comprises three auxiliary oscillators 15, 16, 17 on the basis of which radar transmitter steering pulses generated by a known radar transmitter steering pulse generator 18 can be shifted in frequency for the auxiliary transmitters 8, 13 and on the basis of which the local oscillator signal generated by local oscillator 19 for the receiver means 4 can be shifted for the auxiliary receivers 6, 11. To this end, output signals of auxiliary oscillators 15, 16, 17 are connected to both selector 20 which selects the auxiliary oscillator signal for auxiliary transmitter 8 and auxiliary receiver 6 and to selector 21 which selects the auxiliary oscillator signal for auxiliary transmitter 13 and auxiliary receiver 11. The auxiliary oscillator signal selected by selector 20 is, along with the radar transmitter steering pulse, applied to mixer 22. The resulting frequency-shifted radar transmitter steering pulse is then supplied to auxiliary transmitter 8 via switch element 23. Likewise, the auxiliary oscillator signal selected by selector 21 is, along with the radar transmitter steering pulse, applied to mixer 25 and the frequency-shifted radar transmitter steering pulse is supplied to auxiliary transmitter 13 via switch element 26. In addition, the auxiliary oscillator signals selected by selectors 20 and 21 are used for generating by means of mixers 24 and 27 the frequency-shifted local oscillator signals for auxiliary receivers 6 and 11. These signals are supplied via switch elements 28 and 29 which also receive a non-shifted local oscillator signal. In this way it is possible to apply, as desired, a non-shifted or a shifted local oscillator signal to the auxiliary receivers 6 and 11, as a result of which they remain useful for well-known side-lobe suppression and side-lobe blanking methods. Selection of the auxiliary oscillators mostly occurs pseudo-randomly per transmitted burst. Under the influence of identification means 14, a different auxiliary oscillator frequency can however be selected for one pulse in a burst by switching the selector concerned. Also under the influence of identification means 14, one transmitter steering pulse may be blocked by switching the switch element 23 or 26. Both selectors 20, 21 and switch elements 23, 26, 28, 29 can be designed as solid-state switches, for instance by using PIN diode switches, well-known in the art. Mixers 22, 25 shall be designed such that the original radar transmitter Steering pulse is at least substantially suppressed at the mixer output stage. It is also possible to use an image rejection mixer, which generates just one frequency-shifted transmitter steering pulse. The alternative which also generates an image transmitter steering pulse, offers advantages since it increases the jammer's confusion.

An alternative embodiment enables the combination of mixers 22 and 25 and mixers 24 and 27 by connecting them to the radar transmitter steering pulse to said mixers during transmission and to the local oscillator signal during reception and by connecting additional switch elements at the output stages of said mixers for further routing the mixer output signals. In case of two auxiliary antennas, two auxiliary oscillators are sufficient, provided they are designed as quickly tunable oscillators. The selection of the number of auxiliary antennas plus auxiliary transmitters and auxiliary receivers is of course optional, but it may be advantageous for the number of auxiliary antennas to exceed the number of auxiliary receivers. In that case connection means should be provided for connecting, as desired, an auxiliary antenna with an auxiliary transmitter plus auxiliary receiver. By selecting for a jammer an auxiliary antenna pointing at that jammer, it is possible to further increase the effective power radiated in the direction of that jammer.

Figure 3:
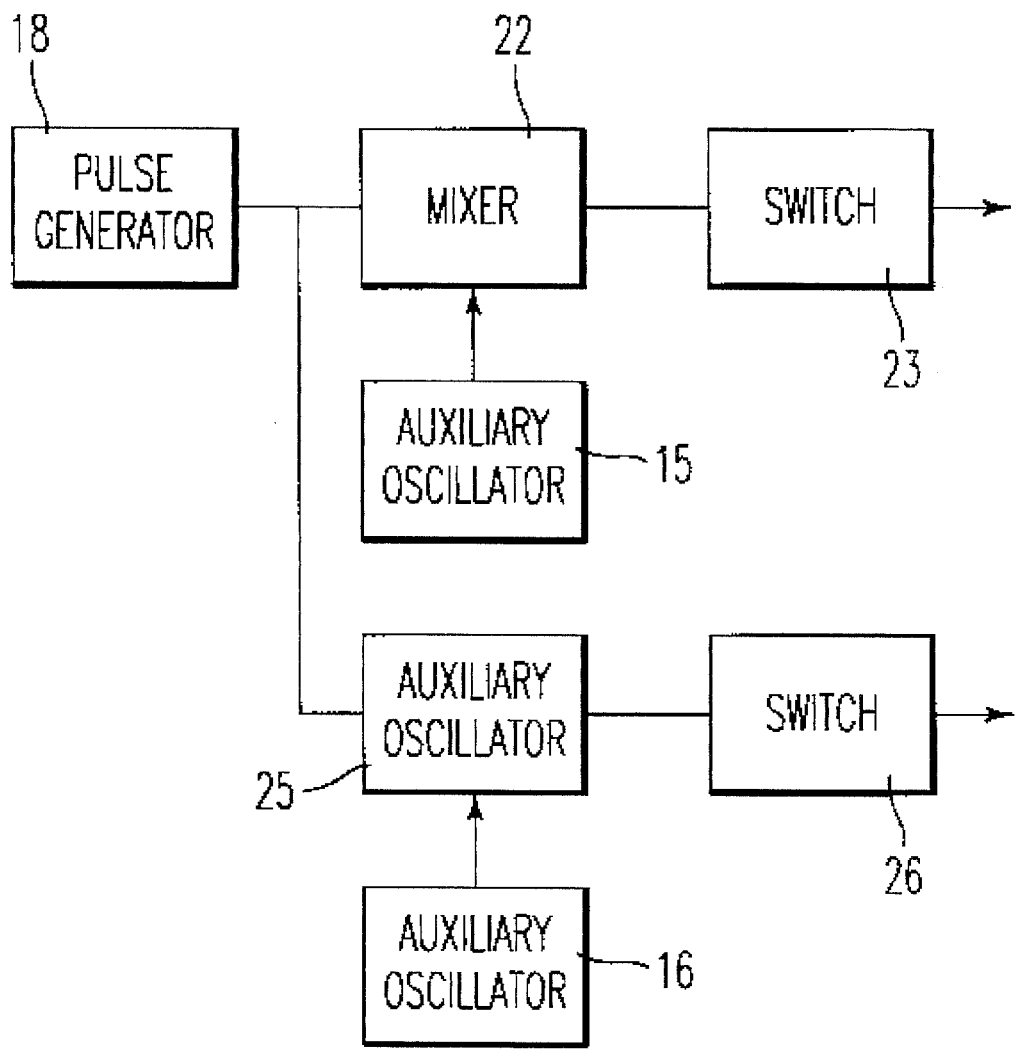
FIG. 3 represents an alternative embodiment of the control means.

FIG. 3 represents a further alternative embodiment, which enables the ECCM provision described in this patent specification to be applied simultaneously with the well-known side-lobe suppression and side-lobe blanking. In this embodiment, a shifted radar transmitter steering pulse is generated for auxiliary transmitter 8 via switch element 23 by means of mixer 22 and auxiliary oscillator 15 and a shifted radar transmitter pulse is generated for auxiliary transmitter 13 via switch element 26 by means of mixer 25 and auxiliary oscillator 16. The auxiliary oscillators may be quickly tunable or switchable types of oscillators for generating one transmitter steering pulse having a diverging frequency in a burst, as described above. Auxiliary receivers 6 and 11 receive a local oscillator signal that is not shifted, as a result of which the side-lobe suppression and side-lobe blanking remain working. Reactions from jammers to transmitter steering pulses, for example transmitted by auxiliary antenna 5, cannot be processed by auxiliary receiver 6 any longer. This requires two additional auxiliary receivers, tuned to the radar transmitter steering pulses shifted by means of auxiliary oscillators 15, 16. In view of these auxiliary oscillators having a fixed frequency during normal operation, the additional auxiliary receivers may also have a fixed tuning, as is well-known in the art. Finally, it is possible to provide the additional auxiliary receivers with shifted local oscillator signals, as indicated in FIG. 2. This will cause the additional auxiliary receivers to be identical to the auxiliary receivers 6, 11.

I claim:
1. Radar apparatus, comprising:
   at least one directional main antenna;
   transmitter means coupled to said at least one directional main antenna;
   steering means coupled to the transmitter means for generating radar transmitter steering pulses;
   receiver means coupled to said at least one directional main antenna and the steering means;
   at least one auxiliary transmitter and auxiliary receiver, said at least one auxiliary transmitter and auxiliary receiver coupled to at least one auxiliary low directivity antenna, said at least one auxiliary receiver coupled to said receiver means, the steering means coupled to said at least one auxiliary transmitter and auxiliary receiver therein to reduce the effect of jammers on the receiver means by generating transmitter steering pulses which deviate from the radar transmitter steering pulses in a different frequency, a different timing, or a different modulation, the transmitter steering pulses being sup- plied to said at least one auxiliary low directivity antenna via said at least one auxiliary transmitter.

2. Radar apparatus as claimed in claim 1, characterised in that the steering means provide for the substantially simultaneous generation of the radar transmitter steering pulses and the transmitter steering pulses.

3. Radar apparatus as claimed in claim 2, characterised in that the steering means provide for the generation of transmitter steering pulses whose frequency deviate from the frequency of the radar transmitter steering pulses.

4. Radar apparatus as claimed in claim 3, characterised in that the steering means provide for the generation of transmitter steering pulses whose type of modulation at least substantially corresponds to the type of modulation of the radar transmitter steering pulses.

5. Radar apparatus as claimed in claim 4, characterised in that the steering means comprise at least one auxiliary oscillator and at least one mixer for generating frequency-shifted radar transmitter steering pulses for the at least one auxiliary antenna.

6. Radar apparatus as claimed in claim 1 in which the main antenna, in addition to an antenna main lobe, also generates antenna side lobes during the emission of radar transmitter pulses, characterised in that the at least one auxiliary antenna generates, during the emission of transmitter pulses, an auxiliary antenna main lobe which is at least substantially stronger than the main antenna side lobes.

7. Radar apparatus as in any of claims 2–6 or 1, characterized in that the apparatus is provided with identification means connected to the at least one auxiliary receiver and the steering means, for analyzing jammer-generated responses to emitted transmitter pulses.

8. Radar apparatus as claimed in claim 7, characterised in that the identification means provide for controlling the steering means.

9. Radar apparatus as claimed in claim 8, characterised in that the controlling modifies at least one transmitter steering pulse.

10. Radar apparatus as claimed in claim 9, the steering means provides for the burst-wise generation of identical radar transmitter steering pulses, characterised in that the command entails the modification of one transmitter steering pulse within a burst.

11. Radar aparatus as claimed in claim 10, characterised in that the modification comprises the omission of the transmitter steering pulse concerned.

12. Radar apparatus as claimed in claim 10, characterised in that the modification comprises the frequency shift of the transmitter steering pulse concerned.

13. Radar apparatus as claimed in claim 10, characterised in that the identification means comprise a database of known jammer signals, comparison means for comparing the received jammer signal with the jammer signals contained in the database, and selection means for selecting commands for the steering means.

\* \* \* \* \*